US008881231B2

(12) United States Patent
Barrus

(10) Patent No.: US 8,881,231 B2
(45) Date of Patent: Nov. 4, 2014

(54) AUTOMATICALLY PERFORMING AN ACTION UPON A LOGIN

(75) Inventor: John Barrus, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 35 days.

(21) Appl. No.: 13/041,769

(22) Filed: Mar. 7, 2011

(65) Prior Publication Data

US 2012/0233615 A1 Sep. 13, 2012

(51) Int. Cl.
*H04L 29/06* (2006.01)
(52) U.S. Cl.
USPC ...... 726/2; 726/27; 726/28; 726/29; 713/170; 713/182
(58) Field of Classification Search
CPC .................. H04L 63/08; G06F 21/31
USPC .......................................................... 726/2
See application file for complete search history.

(56) References Cited

U.S. PATENT DOCUMENTS

| | | | |
|---|---|---|---|
| 5,025,314 A | 6/1991 | Tang et al. | |
| 5,400,069 A | 3/1995 | Braun et al. | |
| 5,570,301 A | 10/1996 | Barrus | |
| 5,790,114 A * | 8/1998 | Geaghan et al. ............. | 715/763 |
| 5,844,569 A | 12/1998 | Eisler et al. | |
| 6,070,247 A | 5/2000 | Wallace et al. | |
| 6,707,444 B1 | 3/2004 | Hendriks et al. | |
| 6,772,335 B2 | 8/2004 | Curtis et al. | |
| 6,917,033 B2 | 7/2005 | Hendriks et al. | |
| 6,963,334 B1 | 11/2005 | Stevens et al. | |
| 6,985,620 B2 | 1/2006 | Sawhney et al. | |
| 7,170,526 B1 | 1/2007 | Johnson | |
| 7,219,233 B1 | 5/2007 | Hendriks et al. | |
| 7,242,389 B1 | 7/2007 | Stern | |
| 7,355,584 B2 | 4/2008 | Hendriks et al. | |
| 7,554,576 B2 * | 6/2009 | Erol et al. .................. | 348/211.3 |
| 7,634,540 B2 | 12/2009 | Ivashin et al. | |
| 7,791,597 B2 | 9/2010 | Silverstein et al. | |
| 8,125,510 B2 | 2/2012 | Agarwal et al. | |
| 8,180,567 B2 | 5/2012 | Geelen et al. | |
| 8,195,952 B2 * | 6/2012 | Andreev et al. ............... | 713/183 |
| 8,234,578 B2 | 7/2012 | Ferren et al. | |
| 8,352,180 B2 | 1/2013 | Geelen et al. | |
| 8,355,038 B2 | 1/2013 | Robinson et al. | |
| 8,390,718 B2 | 3/2013 | Robinson et al. | |
| 2001/0051876 A1 * | 12/2001 | Seigel et al. ...................... | 705/1 |
| 2002/0135536 A1 | 9/2002 | Bruning | |
| 2002/0196327 A1 | 12/2002 | Riu et al. | |

(Continued)

FOREIGN PATENT DOCUMENTS

| | | |
|---|---|---|
| CN | 1617129 A | 5/2005 |
| CN | 101436136 A | 3/2009 |

(Continued)

OTHER PUBLICATIONS

U.S. Appl. No. 13/041,792, filed on Mar. 7, 2011 by John Barrus.

(Continued)

*Primary Examiner* — Mohammad L Rahman
(74) *Attorney, Agent, or Firm* — Kilpatrick Townsend & Stockton LLP

(57) ABSTRACT

Techniques for automatically performing one or more actions responsive to a successful login. In one embodiment, an action automatically performed responsive to the login uses content created prior to the login.

24 Claims, 6 Drawing Sheets

(56) References Cited

U.S. PATENT DOCUMENTS

| | | | |
|---|---|---|---|
| 2003/0058227 A1 | 3/2003 | Hara et al. | |
| 2003/0065722 A1* | 4/2003 | Ieperen | 709/205 |
| 2003/0070072 A1* | 4/2003 | Nassiri | 713/168 |
| 2003/0078840 A1 | 4/2003 | Strunk et al. | |
| 2003/0138135 A1 | 7/2003 | Chung et al. | |
| 2003/0236792 A1 | 12/2003 | Mangerie et al. | |
| 2004/0070616 A1 | 4/2004 | Hildebrandt et al. | |
| 2004/0199639 A1 | 10/2004 | Harris | |
| 2005/0093948 A1 | 5/2005 | Morris et al. | |
| 2005/0104864 A1 | 5/2005 | Zhang et al. | |
| 2006/0053230 A1* | 3/2006 | Montero | 709/238 |
| 2006/0285689 A1 | 12/2006 | Selve | |
| 2007/0216660 A1 | 9/2007 | Sposato et al. | |
| 2007/0245407 A1* | 10/2007 | Lester et al. | 726/5 |
| 2008/0043100 A1 | 2/2008 | Sobel | |
| 2008/0089586 A1 | 4/2008 | Igarashi et al. | |
| 2008/0316348 A1 | 12/2008 | Hallock | |
| 2009/0002346 A1 | 1/2009 | Henning et al. | |
| 2009/0019360 A1 | 1/2009 | Lynggaard et al. | |
| 2009/0021495 A1 | 1/2009 | Edgecomb et al. | |
| 2009/0063492 A1 | 3/2009 | Meyyappan et al. | |
| 2009/0073129 A1 | 3/2009 | Sirotich et al. | |
| 2009/0116703 A1 | 5/2009 | Schultz | |
| 2009/0146973 A1 | 6/2009 | Ung et al. | |
| 2009/0160818 A1 | 6/2009 | Wilde et al. | |
| 2009/0173856 A1 | 7/2009 | Auger et al. | |
| 2009/0173867 A1 | 7/2009 | Auger et al. | |
| 2009/0183228 A1* | 7/2009 | Dasch et al. | 726/1 |
| 2009/0244278 A1 | 10/2009 | Taneja et al. | |
| 2009/0271848 A1 | 10/2009 | Leung et al. | |
| 2009/0309956 A1 | 12/2009 | Hawkins et al. | |
| 2009/0315861 A1 | 12/2009 | Zhang et al. | |
| 2010/0049626 A1 | 2/2010 | Hong et al. | |
| 2010/0073330 A1 | 3/2010 | Ericson et al. | |
| 2010/0149349 A1 | 6/2010 | Kroeker et al. | |
| 2010/0153160 A1 | 6/2010 | Bezemer et al. | |
| 2010/0178645 A1 | 7/2010 | Ieperen et al. | |
| 2010/0182285 A1 | 7/2010 | Tremblay | |
| 2010/0188478 A1 | 7/2010 | Robinson et al. | |
| 2010/0194708 A1 | 8/2010 | Popovich | |
| 2010/0281287 A1 | 11/2010 | Doerksen et al. | |
| 2010/0289776 A1 | 11/2010 | Bryborn Krus et al. | |
| 2010/0293601 A1 | 11/2010 | Schultz et al. | |
| 2010/0293605 A1* | 11/2010 | Longobardi | 726/5 |
| 2010/0315413 A1 | 12/2010 | Izadi et al. | |
| 2010/0315994 A1 | 12/2010 | Lam | |
| 2011/0013001 A1 | 1/2011 | Craven-Bartle et al. | |
| 2011/0084893 A1 | 4/2011 | Lee et al. | |
| 2011/0109554 A1 | 5/2011 | Boissier | |
| 2011/0181520 A1 | 7/2011 | Boda et al. | |
| 2011/0234746 A1 | 9/2011 | Saleh et al. | |
| 2011/0320961 A1* | 12/2011 | Sriraghavan et al. | 715/753 |
| 2012/0030756 A1* | 2/2012 | Todd | 726/21 |
| 2012/0110007 A1 | 5/2012 | Cohen et al. | |
| 2012/0117514 A1 | 5/2012 | Kim et al. | |
| 2012/0218304 A1 | 8/2012 | Anzures et al. | |
| 2012/0229425 A1 | 9/2012 | Barrus et al. | |
| 2012/0229589 A1 | 9/2012 | Barrus | |
| 2012/0229590 A1 | 9/2012 | Barrus | |
| 2012/0233553 A1 | 9/2012 | Barrus | |
| 2012/0274584 A1 | 11/2012 | Schweikart | |
| 2012/0278388 A1 | 11/2012 | Kleinbart et al. | |
| 2012/0280948 A1 | 11/2012 | Barrus et al. | |
| 2012/0281092 A1 | 11/2012 | Olivier et al. | |

FOREIGN PATENT DOCUMENTS

| | | |
|---|---|---|
| EP | 1 613 084 A2 | 1/2006 |
| JP | H06-243076 A | 9/1994 |
| JP | 2000-043486 A | 2/2000 |
| JP | 2007-158601 A | 6/2007 |
| JP | 2008-257660 A | 10/2008 |
| JP | 2009-151508 A | 7/2009 |
| JP | 2012-507052 A | 3/2012 |
| WO | 2006/071637 A2 | 7/2006 |
| WO | 2010053803 A1 | 5/2010 |
| WO | 2010/100157 A1 | 9/2010 |

OTHER PUBLICATIONS

U.S. Appl. No. 13/041,805, filed on Mar. 7, 2011 by John Barrus.
U.S. Appl. No. 13/041,838, filed on Mar. 7, 2011 by John Barrus.
U.S. Appl. No. 13/041,910, filed on Mar. 7, 2011 by John Barrus et al.
U.S. Appl. No. 13/102,963, filed on May 6, 2011 by John Barrus et al.
"Hitachi to Bundle EverNote Software and Technologies With StarBoard Products", Ritescript Press Releases, Nov. 7, 2007, Evernote Corp., 2 pages.
Baker at el., "Computation and Performance Issues in Coliseum, An Immersive Videoconferencing System", Jul. 15, 2003, Mobile and Media Systems Laboratory, HP Laboratories, Palo Alto, USA, 18 pages.
Bezaitis, "New Technologies for Aging in Place", Aging Well, vol. 1 No. 2 p. 26, Spring 2008, Great Valley Publishing Co., Inc., Spring City, USA, 4 pages.
Cisco WebEx Meeting Center—Product Overview: Share ideas with anyone, anywhere—online, Copyright 2011, Cisco Systems, Inc., 2 pages.
Citrix Online, Product Overview|Web Conferencing, Collaboration Tools, Copyright 2011, Citrix Online, 4 pages.
CopyCam Installation and Operation Guide, Copyright 2009, Steelcase Corporation, 72 pages.
Dibbell, "Gestural Interfaces", Technology Review, May/Jun. 2011, MIT, 1 page.
Hitachi Digital Media, "Ultimate Short Throw LCD Projectors for Business and Education, Preliminary Specifications", Sep. 2010, downloaded from internet http://www.hitachiultimateprojector.com/docs/Ultimate_Short_Throw_Brochure_UK_prelim.pdf, 4 pages.
How Aviary Uses Evernote for WhiteBoard Sessions, Aviary.com, downloaded from internet http://www.youtube.com/watch?v=tmtHJ7lJPrc on Apr. 2, 2012, 6 pages.
Ishii et al., "ClearBoard: A Seamless Medium for Shared Drawing and Conversation with Eye Contact", CHI '92, May 3-7, 1992, Association for Computing Machinery, 10 pages.
Ishii et al., "Iterative Design of Seamless Collaboration Media", vol. 37 No. 8, Aug. 1994, Communications of the ACM, Association for Computing Machinery, pp. 84-97, 15 pages.
Kunz et al., "CollaBoard: A Novel Interactive Electronic Whiteboard for Remote Collaboration with People on Content", 2010 International Conference on Cyberworlds, Copyright 2010 IEEE Computer Society, 8 pages.
Larkin, "Editorial Review of *BumpTop*", PCWorld.com, downloaded from internet http://www.pcworld.com/downloads/file/fid,77603/description.html on Sep. 15, 2011, 1 page.
Liao et al., "Robust and Accurate Visual Echo Cancelation in a Full-duplex Projector-camera System", Sep. 9, 2006, 17 pages.
LifeSize Desktop—Superior Standalone HD Desktop Client, Copyright 2010, LifeSize Communications, 2 pages.
Microsoft® Office Live Meeting Feature Guide, Jan. 2005, Microsoft Corporation, 17 pages.
MimioCapture Ink Recording System, Copyright 2011 DYMO Mimio, downloaded from internet http://www.mimio.dymo.com/en-US/Products/MimioCapture.aspx on Sep. 15, 2011, 1 page.
MimioClassroom Solution, Copyright 2011 DYMO Mimio, downloaded from internet http://www.mimio.dymo.com/en-US/Products/MimioClassroom-Family-of-Products.aspx on Sep. 15, 2011, 2 pages.
MimioPad Wireless Tablet, Copyright 2011 DYMO Mimio, downloaded from internet http://www.mimio.dymo.com/en-US/Products/MimioPad-Wireless-Tablet.aspx on Sep. 15, 2011, 1 page.
MimioStudio 9 Software, Jan. 2012 Specifications Sheet, DYMO, 2 pages.
MimioStudio Interactive Software, Copyright 2011 DYMO Mimio, downloaded from internet http://www.mimio.dymo.com/en-US/Products/MimioStudio-Software.aspx on Sep. 15, 2011, 1 page.

(56) References Cited

OTHER PUBLICATIONS

MimioTeach Interactive System, Copyright 2011 DYMO Mimio, downloaded from internet http://www.mimio.dymo.com/en-US/Products/MimioTeach-Interactive-System.aspx on Sep. 15, 2011, 2 pages.
MimioTeach, Jan. 2012 Specifications Sheet, DYMO, 2 pages.
MimioView Document Camera, Copyright 2011 DYMO Mimio, downloaded from internet http://www.mimio.dymo.com/en-US/Products/MimioView-Document-Camera.aspx on Sep. 15, 2011, 1 page.
Mohan et al., "Bokode: Imperceptible Visual tags for Camera Based Interaction from a Distance", Camera Culture Group, MIT Media Lab, downloaded from internet http://cameraculture.media.mit.edu/bokode on Sep. 15, 2011, 12 pages.
Raskar et al., "The Office of the Future: A Unified Approach to Image-Based Modeling and Spatially Immersive Displays", Jul. 19-24, 1998, SIGGRAPH 98, Orlando, Florida, Computer Graphics Proceedings, Annual Conference Series, 10 pages.
Screen sharing, Skype, downloaded from internet http://www.skype.com/intl/en-us/features/allfeatures/screen-sharing/ on Jan. 18, 2012, 4 pages.
Scriblink, Copyright 2012 Scriblink LLC., downloaded from internet http://www.scriblink.com/index.isp?act=about on Feb. 7, 2012, 1 page.
SMART Bridgit™ conferencing software, Copyright 2011, SMART Technologies, 2 pages.
SMART Notebook™ 10.8—Mac OS X operating system software User's guide, Copyright 2008-2011, SMART Technologies ULC., 134 pages.
Tan et al., "ConnectBoard: A remote collaboration system that supports gaze-aware interaction and sharing", MMSP 2009: IEEE International Workshop on Multimedia Signal Processing, Oct. 5-7, 2009, Rio de Janeiro, Brazil, Abstract downloaded from internet ieeexplore.ieee.orq/xpl/freeabs_all.jsp?arnumber=5293268 on Feb. 7, 2012, 1 page.
Tan et al., "ConnectBoard: Enabling Genuine Eye Contact and Accurate Gaze in Remote Collaboration", IEEE Transactions on Multimedia, vol. 13, No. 3, Jun. 2011, pp. 466-473, 9 pages.
Tan et al., "Enabling Genuine Eye Contact and Accurate Case in Remote Collaboration", Presented at IEEE International Conference on Multimedia and Expo, Jul. 19, 2010, Mobile and Media Systems Laboratory, HP Laboratories, Palo Alto, USA, pp. 430-435, 7 pages.
Tang et al., "VideoArms: Embodiments for Mixed Presence Groupware", Sep. 11-15, 2006, Copyright 2006 ACM, London, UK, 16 pages.
VNC Enterprise Edition—Product Information: Overview, Copyright 2011, RealVNC Limited, 2 pages.
Wacom Components: Input Technology, Copyright 2007 Wacom, downloaded from internet http://www.wacom-components.com/english/technology/index.html on Sep. 15, 2011, 2 pages.
Wacom Components: Input Technology: EMR Technology, Copyright 2007 Wacom, downloaded from internet http://www.wacom-components.com/english/technology/emr.html on Sep. 15, 2011, 4 pages.
Wacom Components: Input Technology: Features and Advantages of EMR Technology, Copyright 2007 Wacom, downloaded from internet http://www.wacom-components.com/english/technology/feature.html on Sep. 15, 2011, 2 pages.
Wacom Components: Input Technology: Mobile Equipment, Copyright 2007 Wacom, downloaded from internet http://www.wacom-components.com/english/technology/mobile.html on Sep. 15, 2011, 3 pages.
Wacom Components: Input Technology: Penabled Technology, Copyright 2007 Wacom, downloaded from internet http://www.wacom-components.com/english/technology/penabled.html on Sep. 15, 2011, 1 page.
Wacom Components: Input Technology: Touch Technology, Copyright 2007 Wacom, downloaded from internet http://www.wacom-components.com/english/technology/touch.html on Sep. 15, 2011, 3 pages.
Wilson et al., "Combining Multiple Depth Cameras and Projectors for Interactions on, Above, and Between Surfaces", Oct. 3-6, 2010, UIST '10, ACM, New York, USA, 10 pages.
Katz, "Chemistry in the Toy Store™", 6th Edition, Updated 2002, 13 pages.
Lee, Low-Cost Multi-Point Interactive Whiteboard using the Wiimote, downloaded from internet http://www.youtube.com/watch?v=5s5EvhHy7eQ on Apr. 26, 2012, 2 pages.
Faces in Real-Life Images, downloaded from internet http://people.cs.umass.edu/~elm/realfaces/call.html on Apr. 26, 2012, 2 pages.
Face Recognition Homepage downloaded from internet http://www.face-rec.org/conferences/ on Apr. 26, 2012, 7 pages.
Sticky-Notes.net, downloaded from internet http://www.sticky-notes.net on Apr. 26, 2012, 3 pages.
Mistry, "Quickies, Intelligent Sticky Notes", MIT Media Lab, downloaded from internet http://pranavmistry.com/projects/quickies/ on Apr. 26, 2012, 4 pages.
Quickies: Sticky Notes of 21st Century, downloaded from internet http://www.youtube.com/watch?v=HQT5_4aVvHU on Apr. 26, 2012, 3 pages.
Post-It Digital Notes, downloaded from internet http://download.cnet.com?Post-it-Digital-Notes/3000-2351_4-10060027.html on Apr. 26, 2012, 7 pages.
Non-Final Office Action for U.S. Appl. No. 13/041,792 mailed Jun. 7, 2012, 17 pages.
Non-Final Office Action for U.S. Appl. No. 13/102,963 mailed on Jan. 22, 2013, 8 pages.
Non-Final Office Action for U.S. Appl. No. 13/041,910 mailed on Jan. 24, 2013, 17 pages.
Final Office Action for U.S. Appl. No. 13/041,792 mailed on Oct. 17, 2012, 18 pages.
Non-Final Office Action for U.S. Appl. No. 13/041,805 mailed on Oct. 30, 2012, 8 pages.
Final Office Action for U.S. Appl. No. 13/102,963 mailed on Aug. 22, 2013, 10 pages.
Non-Final Office Action for U.S. Appl. No. 13/041,838 mailed on Sep. 5, 2013, 6 pages.
Final Office Action for U.S. Appl. No. 13/041,910 mailed on Jun. 20, 2013, 20 pages.
Non-Final Office Action for U.S. Appl. No. 13/041,792 mailed on Dec. 5, 2013, 21 pages.
Notice of Allowance for U.S. Appl. No. 13/041,838 mailed on Dec. 18, 2013, 9 pages.
Apperley et al., "*Use of Video Shadow for Small Group Interaction Awareness on a Large Interactive Display Surface*", The Computer Science Department University of Waikato, Hamilton, New Zealand, 2002, 10 pages.
Extended European Search Report for European Application No. 12156226.8 dated May 9, 2012, 5 pages.
Office Action in related Japanese Application No. 2012-047976 dated Nov. 19, 2013, 3 pages.
Advisory Action for U.S. Appl. No. 13/102,963 mailed on Jan. 14, 2014, 3 pages.
Non-Final Office Action for U.S. Appl. No. 13/041,805 mailed on Feb. 21, 2014, 5 pages.
Office Action in related Japanese Application No. 2012-047976 dated Apr. 15, 2014, 3 pages. (no translation available).
Extended European Search Report for corresponding European Application No. 12156239.1 dated Apr. 15, 2014, 7 pages.
Final Office Action for U.S. Appl. No. 13/041,792 mailed on May 14, 2014, 25 pages.
Notice of Allowance for U.S. Appl. No. 13/041,805 mailed on Jun. 11, 2014, 7 pages.
English translation and Notification of the First Office Action for corresponding Chinese Patent Application No. 20121005694 dated Jun. 17, 2014, 22 pages.
Non-Final Office Action for U.S. Appl. No. 13/041,910 mailed on Aug. 25, 2014, 20 pages.

* cited by examiner

AUTOMATICALLY PERFORMING AN ACTION UPON A LOGIN

BACKGROUND

Embodiments of the present invention relate to computer systems, and more particularly to techniques for automatically performing one or more actions responsive to a successful login.

Most computers require a user to log into the system before the user can access any data or applications provided by the system. The resources provided by the computer system are thus not available and cannot be used until after the user has successfully logged in. After the user has logged in, the user may then manually open one or more applications, create content using the application, provide instructions to save the content, etc. This reliance upon a login is however quite restrictive.

Some Internet-based applications such as shopping carts on many commercial websites allow a user to open a shopping cart and fill it with items to be purchased without requiring a login. However, in order to purchase the items in the shopping cart, the user has to first login and then manually go through a series of user-interactive steps to complete the purchase of the items, which then associates the items with the user's account.

BRIEF SUMMARY

Embodiments of the present invention provide techniques for automatically performing one or more actions responsive to a successful login. In one embodiment, an action performed responsive to the login uses content created prior to the login.

In one embodiment, techniques, including a method, system, and a plurality of executable instructions stored on a non-transitory computer-readable storage medium, are provided for creating, at a first system, content prior to a login. Responsive to a login at the first system, the system causes an action to be performed using the content created prior to the login.

In one embodiment, the action comprises saving the content created prior to the login to an account corresponding to the login.

In one embodiment, processing may be performed to determine the action to be performed based upon information associated with the login.

In one embodiment, the first system may receive, from a second system located remotely from the first system, content created prior to the login using the second system. The action that is performed uses this content received from the second system.

In one embodiment, the first system may capture information input using a writing instrument at the first system prior to the login. The first system may then determine digital information corresponding to the information input using the writing instrument. The action performed responsive to the login may use the digital information.

Various different actions may be performed responsive to the login. In one embodiment, the action may comprise outputting the digital information on a display surface of the first system.

In one embodiment, audio or video information may be captured prior to the login using one or more devices of the first system. The action to be performed may comprise performing the action using the captured audio or video information.

In one embodiment, the first system may enable a login by reading a barcode or a radio frequency identification (RFID) tag.

The foregoing, together with other features and embodiments will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

Figure 1:
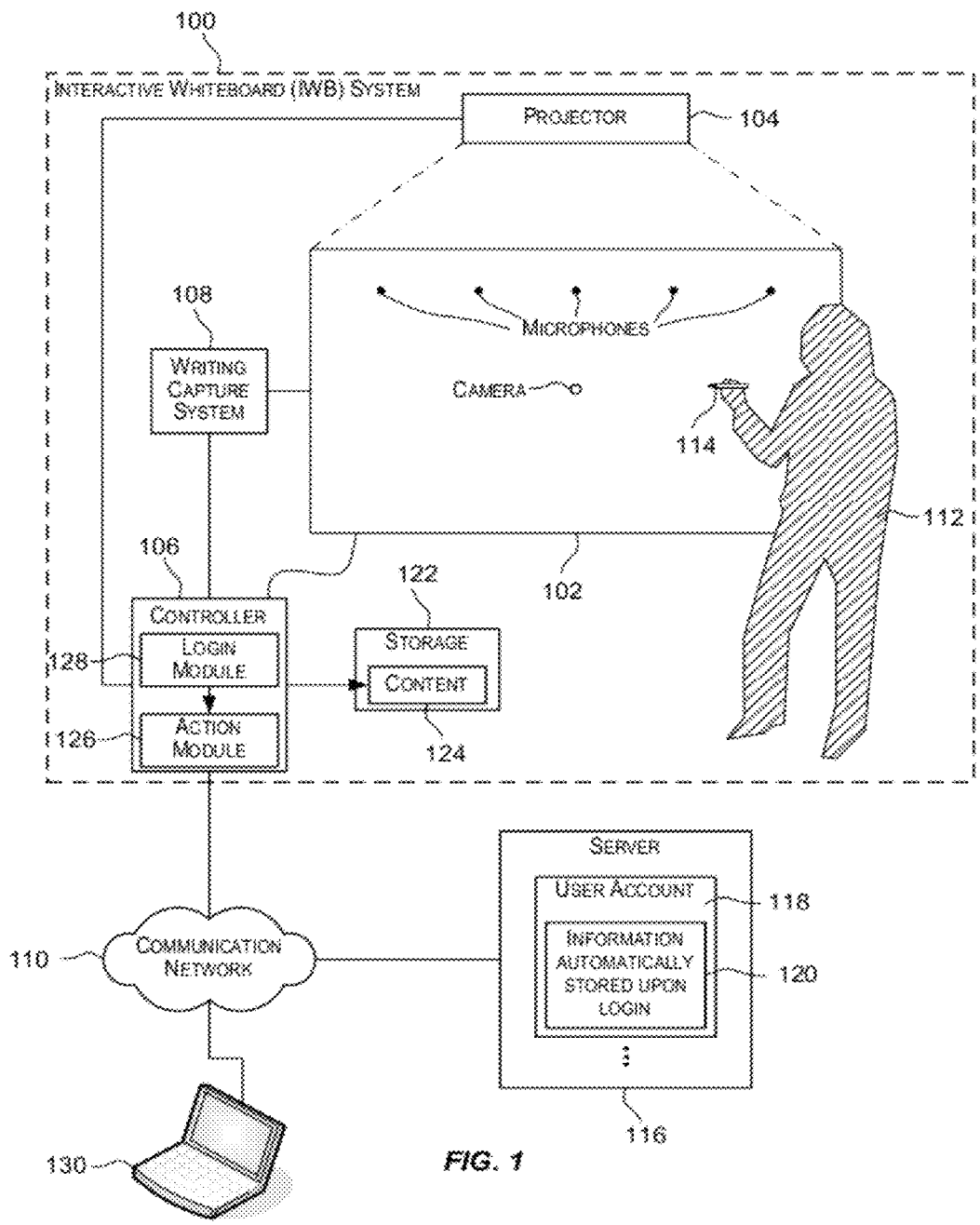
FIG. 1 is a simplified block diagram of an Interactive Whiteboard (IWB) system 100 that may incorporate an embodiment of the present invention.

FIG. 1 is a simplified block diagram of an Interactive Whiteboard (IWB) system 100 that may incorporate an embodiment of the present invention. IWB system 100 may comprise several components including a display surface 102, a projector 104, a controller 106, and a writing capture system 108. The components of system 100 depicted in FIG. 1 are meant for illustrative purposes only and are not intended to limit the scope of invention embodiments in any manner. Alternative embodiments may have more or fewer components than those shown in FIG. 1.

Display surface 102 (also sometime referred to as the "whiteboard" or "drawing surface" of the IWB system) provides both an input and an output interface for users of IWB system 100. As an input interface, it enables a user to provide writing (also referred to as drawing) input, which is then converted to digital information (also referred to as digital representation of the writing). As an output interface, digital information may be projected on to surface 102 by projector 104 such that the projected information can be viewed by one or more users of IWB system 100. One or more users of IWB system 100 may provide input to IWB system 100 by writing using one or more writing instruments. For example, as shown in FIG. 1, a user 112 may write on surface 102 using writing instrument 114. The term writing or drawing or writing information, as used in this application, may include one or more characters, letters, symbols, words, sentences, tables, drawings, sketches, figures, or any other type of input that can be provided using writing instrument 114. As another example, a writing or drawing can include hand-written letters, numbers, or symbols, expressed in any language or format. As yet another example, a writing or drawing can comprise a combination of hand-drawn pictorial and textual elements.

The user's writings made using the writing instrument are captured by writing capture system 108 and communicated to controller 106, which determines digital information corresponding to the writings. The digital information may then be communicated to projector 104 for projection on to surface 102. The digital information may be in various forms such as a time-ordered series of strokes, a pixel-based image, plain or formatted text, and the like.

A user of IWB system 100 may use various different writing instruments to write or provide input. In one embodiment, the writing instrument may be a physical object that may or may not leave a visible mark on surface 102. For example, a user may use his finger as a writing instrument to write on surface 102. Even though the finger may not leave any visible mark on surface 102, the finger's movements are captured and then translated to digital information, which may then be projected on surface 102. As another example, the user may use a pointer or a stylus as a writing instrument to write on surface 102, where the stylus may not leave any physical visible mark on surface 102. In other embodiments, a user may also use a writing instrument that leaves a visible mark on surface 102. For example, a user may use a pen or a regular dry erase marker to write on surface 102. The user's writings are captured, digital information corresponding to the writings determined, and the digital information then projected on surface 102.

In one set of embodiments, in addition to writing, a writing instrument 114 may also be used to interact in other ways with IWB system 100. For example, in one embodiment, writing instrument 114 may be used to erase previously written information.

Surface 102 may be a passive or active surface. In one embodiment, surface 102 may be a passive surface that simply accepts marks from a pen than can be identified by an external sensor like a camera. For example, display surface 102 may be a plain old opaque whiteboard. In another embodiment, surface 102 may be an active surface like a surface containing a sensor, for example from Wacom Co., Ltd in Japan. Such sensors contain an antenna and interact with Radio Frequency Identification (RFID) pens containing a passive coil. By activating the antenna in a specific way, the pen can be triggered and the antenna can measure the pen's response to the antenna and identify the pen's location and orientation. Other active surfaces include resistive touch systems which measure a change in resistance to identify the location of an object pressing against the screen. Other examples of active surfaces include glass boards surrounded with infrared LEDs which use "frustrated total internal reflection" (FTIR) to allow a camera to capture the location of a finger or pen on the surface or a capacitive touch screen like those found on iPad and iPhone devices from Apple, Inc. in Cupertino, Calif.

Writing capture system 108 is configured to capture the writings made by a user using writing instrument 114. The writing information captured by writing capture system 108 may then be communicated to controller 106 for further processing. Writing capture system 108 may comprise one or more components that enable the writings made using writing instrument 114 to be captured. For example, in an embodiment where a writing instrument that leaves a visible mark on surface 102 is used, writing capture system 108 may comprise a camera that is positioned in front of surface 102 and configured to capture images of surface 102, where the captured images include the visible marks made on surface 102 using writing instrument 114. The captured images may then be communicated to controller 106, which is configured to process the images to determine digital information corresponding to the visible marks made on surface 102.

In another embodiment, writing capture system 108 may comprise one or more sensors that are configured to capture the motion or movement of the writing instrument when the user uses the writing instrument to write. The motion may be captured using different techniques. According to one technique, motion sensors may be placed along surface 102 that are capable of capturing the motion of the writing instrument in a 2-dimensional plane (or in three dimensions). The captured motion information may then be conveyed to controller 106, which may process the captured information to determine the user's writings and determine digital information corresponding to the writings.

In yet another embodiment, writing capture system 108 may comprise one or more pressure sensors that may be incorporated into surface 102 making surface 102 pressure sensitive. Such a pressure mapping multi-touch surface can be built from force sensitive resistor material sandwiched between a flexible electronic circuit like those available from TekScan, Inc. in South Boston, Mass. In such an embodiment, surface 102 may provide a multi-touch pressure sensing surface that can capture writing information based upon a user's touches on surface 102. The information captured by pressure sensors may then be communicated to controller 106 for further processing. In one embodiment, in addition to sensing a user's writing, the pressure sensors may also be able to determine the force with which a user writes on surface 102. This force information may also be communicated to controller 106 for further processing and analysis.

In yet another embodiment, surface 102 may be a capacitively-coupled input interface such as a surface found on an Apple iPad™ or iPhone™ device. In such an embodiment, surface 102 may enable a multi-touch input experience, zooming and panning capabilities, and the like. In such an embodiment, a user may use a finger or a conductive stylus to write on surface 102 and the writings may then be communicated to controller 106 for processing and analysis.

In order to be able to capture the writings made using writing instrument 114, in one embodiment, writing capture system 108 may be communicatively linked with writing instrument 114. This link, which may be wired or wireless, enables writing capture system 108 to capture the writings made using the writing instrument.

Controller 106 acts as a central component for performing processing that controls and enables the various functions provided by IWB system 100. Controller 106 may be operatively coupled to one or more other components of IWB system 100 and configured to control and/or coordinate the functions performed by these components. For example, controller 106 may be operatively coupled to writing capture system 108 and/or to display surface 102 and configured to receive information captured by writing capture system 108. The information received by controller 106 from writing capture system 108 may be in various different formats such as pressure information, motion information, strokes information, and the like. Controller 106 is configured to process the received information and determine digital information corresponding to the received information. The determined digital information may then be communicated to projector 104 so that it can be projected on surface 102.

Figure 6:
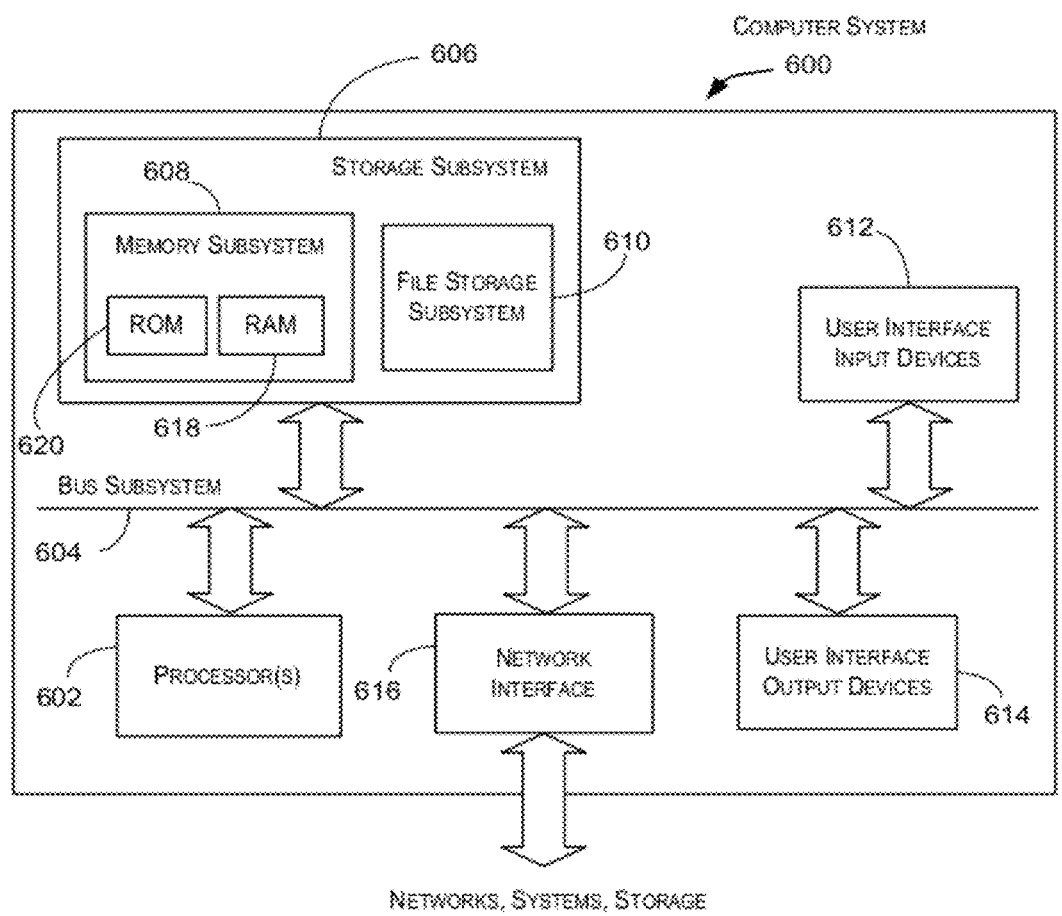
FIG. 6 is a simplified block diagram of a computer system that may be used to practice an embodiment of the present invention.

Controller 106 is typically a processor-based computing device. An example of controller 106 is depicted in FIG. 6 and described below. In alternate embodiments, controller 106 may be a processor, a programmable logic device, and the like. Controller 106 may execute one or more programs (code instructions), which when executed by a processor of controller 106, enable the processing performed by controller 106.

As described above, controller 106 is configured to determine digital information corresponding to information input using a writing instrument. In one embodiment, as part of this processing, controller 106 may be configured to determine strokes information based upon the information received from writing capture system 108 and then determine digital information corresponding to the strokes information. The strokes information may comprise information related to a collection of time-ordered strokes. In one embodiment, a stroke may correspond to data produced by a writing instrument from the time the writing instrument is engaged (i.e., used for writing) until the writing instrument is disengaged. For example, in one embodiment, a stroke may correspond to data produced by a writing instrument from the time the writing instrument makes contact with surface 102 until the contact is interrupted or broken. A stroke may be considered the most fundamental unit used for representing information input by a user using a writing instrument. Each stroke has an associated time component indicative of when the stroke was made. The information input or written by a user using writing instrument 114 may be represented by a series or set of time-ordered strokes. Controller 106 may then determine digital information corresponding to the strokes information.

In an alternative embodiment, writing capture system 108 may itself be able to determine strokes information and communicate the strokes information to controller 106. Controller 106 may then determine digital information directly from the information received from writing capture system 108.

The digital information determined by controller 106 may be stored locally in a non-volatile storage 122. For example, the digital information determined by controller 106 may be stored as content 124 in storage 122. In one embodiment, the information received by controller 106 from writing capture system 108 or a portion of that information may also be stored locally as part of content 124.

Accordingly, controller 106 may receive raw sensor data captured by writing capture system 108 and then determine strokes information based upon the raw data or alternatively, may receive strokes information from writing capture system 108. Controller 106 may then determine digital information corresponding to the strokes information. In some embodiments, the digital information may be determined directly from the raw sensor data. The digital information determined by controller 106 is such that it reflects the writings made using writing instrument 114. For example, if the user writes a "W" on surface 102 using writing instrument 114 then the digital information determined by controller 106 may be a digital representation of "W". Controller 106 may then communicate the determined digital information to projector 104 for projection on surface 102.

Projector 104 is configured to project and display information received from controller 106 on display surface 102. In one embodiment, projector 104 receives a signal (e.g., a video signal) from controller 106 comprising digital information determined by controller 106 corresponding to writings made using a writing instrument. Projector 104 is configured to project or output the received signal on to surface 102 such that the digital information corresponding to the writings is output or displayed on surface 102 and made viewable to one or more users of IWB system 100. In one embodiment, the digital information corresponding to a writing is projected on to surface 102 in such a manner that the digital information is projected in the same location as the writing on surface 102. For example, if a user uses a writing instrument to write a "W" on surface 102, the digital information (e.g., the digital "W") is projected on to the same location of surface 102 where the user wrote the "W".

In one embodiment, projector 104 is a short throw projector that is positioned at a short distance in front of surface 102 such that it can project the digital information on to surface 102. For example, projector 104 may be an ultra short throw projector that is positioned in front of surface 102 and projects the information received from controller 106 on to surface 102. An example of such a projector is the CP-AW250NM produced by Hitachi, Ltd. Other types of front throw projectors may be used in alternative embodiments. Projector 104 may project in different resolutions including high definition (e.g., 1920×1080) resolutions.

IWB system 100 may also comprise one or more devices for capturing other types of information such as audio, video, image, and/or other types of information. The information captured by these devices may be communicated to controller 106. Controller 106 may use this information to perform various types of processing. For example, in one embodiment, controller 106 may be configured to correlate the information captured using these devices with the digital information determined by controller 106 based upon the temporal attributes of the captured information and the digital information. In one embodiment, the information captured by the one or more devices may be stored locally in storage 122 as part of content 124.

For example, the capture devices may include audio recording devices that are configured to capture audio information. According to one use case, IWB system 100 may be used in a corporate meeting setting and the microphones may capture audio information spoken by the meeting attendees. As shown in FIG. 1, in one embodiment, the microphones may be embedded in surface 102 to optimize the audio capture process. In alternative embodiments, the microphones may be separate from surface 102. The captured audio information may be communicated to controller 106 for processing and analysis.

IWB system 100 may also comprise one or more devices for capturing video and/or image information. These devices may include for example one or more cameras that are capable of capturing image or video information. In one embodiment, the cameras may be positioned so as to capture images or videos of users of IWB system 100. For example, as shown in the embodiment depicted in FIG. 1, a camera may be associated with surface 102 such that images of one or more users positioned nearby or in front of surface 102 can be captured. The captured video/image information may be communicated to controller 106 for processing and analysis.

IWB system 100 may be coupled to a communication network 110 and be capable of communicating with other devices, including other IWB systems, systems, and storage connected to communication network 110. For example, as shown in FIG. 1, IWB system 100 may be communicatively coupled to one or more servers 116 or user computers 130 via communication network 110. Communication network 110 may be a single communication network or a collection of communication networks. The networks may include the Internet, an intranet, a local area network (LAN), a wide area network (WAN), a wireless network, a private network, a public network, a switched network, or any other suitable communication network that enables communications between IWB system 100 and other devices or systems coupled to communication network 110. One or more different communication protocols (e.g., Ethernet, various wireless protocols) may be used to facilitate the communications using communication network 110.

In one embodiment, controller 106 of IWB system 100 provides a network interface that couples IWB system 100 to communication network 110 and facilitates communications via communication network 110. IWB system 100 may be connected to communication network 110 via wired or wireless links.

Controller 106 may comprise one or more modules that provide the functionality provided by controller 106. These modules may be implemented in hardware, software, or combinations thereof. For example, in one embodiment, a module may be implemented in software (program, code, instructions), which when executed by a processor of controller 106 provides the functionality provided by the controller. In one embodiment, as depicted in FIG. 1, controller 106 comprises a login module 128 and an action module 126.

Login module 128 enables a user to log into IWB system 100. Login module 128 thus provides a login capability for IWB system 100. Various different login techniques may be used. For example, in one embodiment, the login procedure may require a user to provide a user identifier and a password. Login module 128 may provide an interface enabling the user to input the user identifier and password. Login module 128 may be configured to authenticate the provided user identifier and password and enable the login only if the authentication is successful.

According to another technique, the login procedure may be facilitated using an RFID or a barcode reader/scanner provided by IWB system 100. In such an embodiment, the reader may be configured to read information from an RFID tag or scan a barcode. Information read from the tag or encoded by the read barcode may then be authenticated and used to control the login. For example, a user's badge may comprise an RFID tag storing user-related information used for logging into IWB system 100. In order to log into IWB system 100 the user may present his/her badge in such a way that enables the RFID reader provided by IWB system 100 to read the tag information. The information read from the RFID tag on the badge may then be used to authenticate and login the user. Various other login techniques may be used in alternative embodiments.

It should be appreciated that, while IWB system 100 enables user logins, these logins are not a prerequisite for using the various features of IWB system 100 described above. For example, a user does not need be logged into IWB system 100 in order to be able to use IWB system 100 as described above. For example, the features of enabling a user to create content by writing using a writing instrument, the ability to capture the user's writings, the determination of digital information corresponding to the writings, the projecting of the digital information on to surface 102, the capturing and processing of audio/video/image or other information captured by devices of IWB system 100, and the storing of the digital information and other captured information can be performed without requiring any user login (i.e., are not contingent upon a user being logged into IWB system 100). However, as described below, logging into IWB system 100 opens up a new set of additional features and/or services provided by IWB system 100. However, if a user is not interested in any of these additional features and/or service, then no login is required for using IWB system 100.

In one embodiment, upon a successful login, login module 128 is configured to send a signal to action module 126 indicating that a successful login has occurred. The signal sent to action module 126 may comprise information provided to or determined by login module 128 as part of the login procedure. For example, in one embodiment, the user identifier and password provided to login module 128 by the user may be provided to action module 126. Action module 126 is then configured to initiate one or more actions in response to the successful login. In one embodiment, the one or more actions are initiated automatically responsive to a successful login without requiring any interaction or input from the user who has successfully logged into IWB system 100.

Various different actions may be initiated by action module 126 responsive to a login. In one embodiment, the one or more actions that are automatically initiated use content that has been created and stored prior to the login. As described above, IWB system 100 may be used without a login. For example, a user may provide input using a writing instrument and the IWB system may be configured to determine digital information for the user's writings, all without requiring a login. Accordingly, when a user logs into IWB system 100, content 124 may have already been created and stored by IWB system 100 prior to the login. This content may comprise, for example, digital information determined by controller 106 corresponding to inputs provided by a user using a writing instrument prior to the login. Content 124 may also comprise other types of information (e.g., audio, video, image information) captured by devices of IWB system 100 prior to the login. Accordingly, content 124 may comprise content information created and stored using IWB system 100 prior to the login. In one embodiment, the one or more actions that are automatically initiated responsive to the login use the content, or a portion thereof, created and stored by the IWB system prior to the login.

In one embodiment, the action to be performed responsive to a login may be preconfigured for IWB system 100. For example, a default action may be preconfigured for IWB system 100 and performed responsive to each login.

In an alternative embodiment, the one or more actions that are performed in response to a successful login are determined based upon information associated with the successful login. As described above, upon a successful login, login module 128 is configured to send information related to the login to action module 126. Action module 126 may then determine the set of one or more actions to be initiated based upon the received login-related information. Action module 126 may then initiate the determined one or more actions.

Accordingly, in one embodiment, the one or more actions that are initiated responsive to a login are login specific and may differ from one user login to another. For example, a first user and a second user may be using IWB system 100 during a meeting without logging into the system. During the meeting, the first user and/or the second user may write on surface 102 using one or more writing instruments. The users' writings are captured by writing capture system 108 and communicated to controller 106. Controller 106 may then determine digital information corresponding to the writings. The determined digital information may be projected on to surface 102 using projector 104. The digital information may also be saved to storage 122 as content 124. Then at some time T1, the first user may decide to log into IWB system 100 by providing user identification information and a password. Upon a successful login, login module 128 may send a signal to action module 126 indicative of the successful login and comprising the user identification information. Action module 126 may then determine and initiate an action to be performed based upon the user identification information for the first user. The action may comprise copying and storing content 124 (or a portion thereof) stored prior to time T1 to storage associated with a user account corresponding to the first user. At some later point T2, where T2 is after T1, the second user may log into IWB system 100 by providing user identification information and an associated password. Upon a successful login, login module 128 may send a signal to action module 126 indicative of the successful login of the second user and comprising user identification information for the second user. Action module 126 may then determine and initiate an action to be performed based upon the user identification information for the second user. The action may comprise automatically communicating content 124 (or a portion thereof) stored prior to T2 to the second user (e.g., an email may be sent to the second user with the content as an attachment). In this manner, an action that is initiated responsive to a login is automatically determined based upon the login. Further, the action uses content created and stored prior to the login. Accordingly, the action determined and initiated for a first user login may be different from the action triggered due to the login of a second user.

IWB system 100 may continue to capture user writings, determine digital information corresponding to the writings, project the determined digital information on to surface 102, and store the determined digital information as part of content 124 after a login. An action performed automatically in response to a login may be periodically performed on content information stored after the login. For example, after time T1 (in the example previously described), portions of content 124 stored after T1 may be periodically stored to the user account corresponding to the first user. Likewise, after time T2, the portions of content 124 stored after T2 may be periodically communicated to the second user.

Examples of actions that may be automatically performed in response to a login are listed below. This list is not intended to be restrictive. One or more of the actions listed below may be performed automatically upon a successful login.

(1) Storing content 124 (or a portion thereof), which are created and stored prior to the login, to an account corresponding to the successful login. For example, as shown in FIG. 1, a server 116 coupled to IWB system 100 via communication network 110 may provide storage for multiple user accounts. The action performed responsive to a login may include storing content 124, or a portion thereof, as information 120 associated with a user account 118 corresponding to the login on a remote server (e.g., a cloud-based account). This stored information 120 may then be accessed by the user by logging into user account 118. For example, a user may use a computer 130 to log into user account 118 and find information 120 stored under the user account. Content from multiple IWB systems may be stored to the same user account responsive to the user logging into the multiple IWB systems.

(2) Communicating content 124 (or a portion thereof), which are created and stored prior to the login, to the user corresponding to the successful login. For example, content 124 may be attached to an email and the email sent to the user corresponding to the successful login.

(3) Formatting content 124 (or a portion thereof), which are stored prior to the login, to a specified format corresponding to the successful login.

As described above, in an IWB system, a user's writings are converted to digital information, which is then projected and displayed on a surface of IWB system 100. Converting the "written" information to digital information enables several operations, which can be performed on electronic information, to be now performed on information written on a whiteboard. The true power of such a system is realized when used in a collaborative setting. For example, two or more IWB systems may be internetworked via a communication network (such as the Internet) and be used in a collaborative manner.

Figure 2:
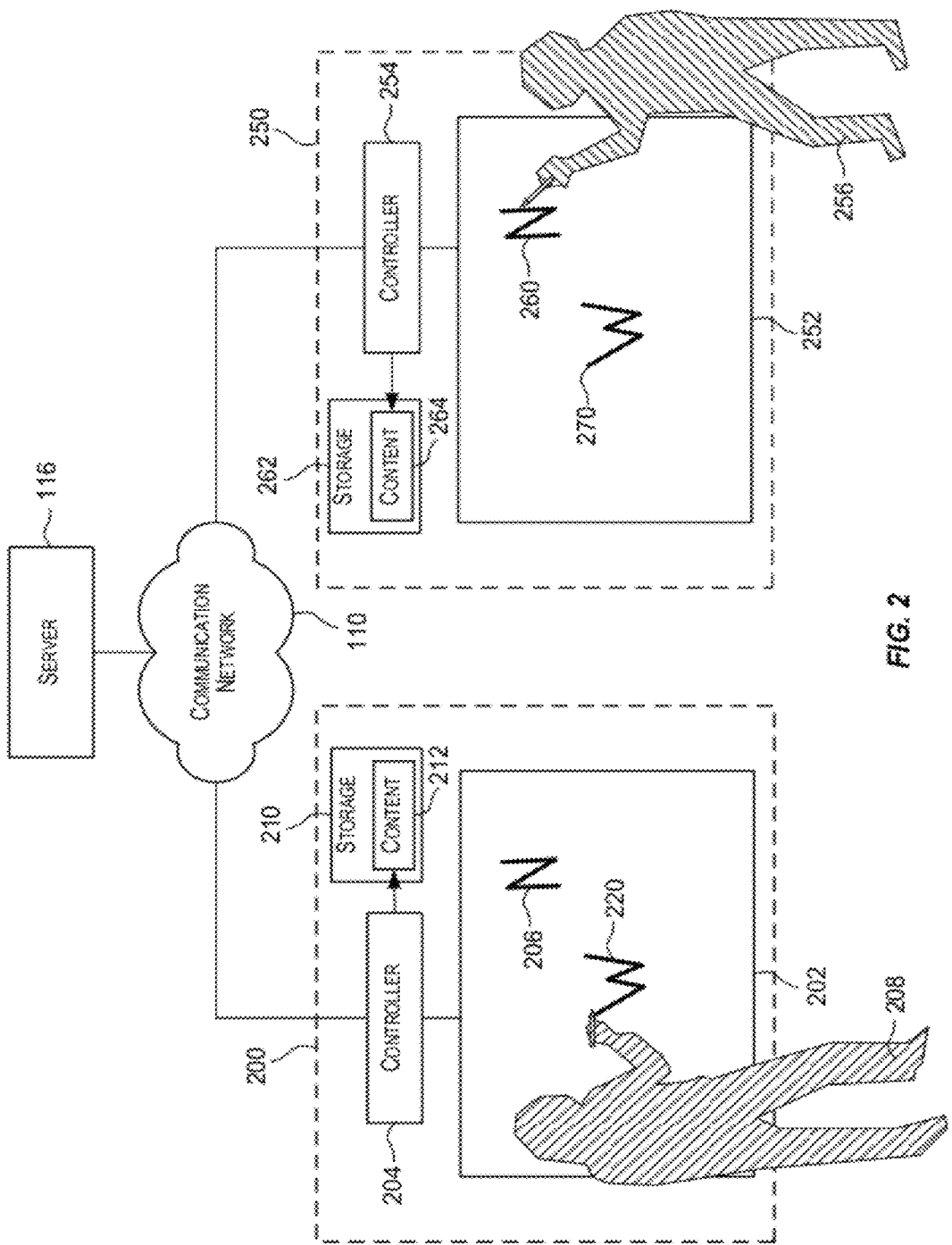
FIG. 2 is a simplified block diagram of a network environment in which multiple IWB systems are networked via a communication network and participate in a collaborative session according to an embodiment of the present invention.

FIG. 2 is a simplified block diagram of a network environment in which multiple IWB systems are networked via a communication network and participate in a collaborative session according to an embodiment of the present invention. As shown in FIG. 2, an IWB system 200 is communicatively coupled with another remotely located IWB system 250 via communication network 110. IWB system 200 and IWB system 250 can each be substantially similar in configuration to IWB system 100 depicted in FIG. 1

The controller of each IWB system may provide an interface to communication network 110. For example, in FIG. 2, controller 204 may provide a network interface coupling IWB system 200 to communication network 110 while controller 254 may provide a network interface coupling IWB system 250 to network 110.

IWB systems 200 and 250 may participate in a collaborative session. During such a collaborative session, the IWB systems communicate information with each other such that any information written by a user at one of the IWB systems is projected and displayed on the display surfaces of the other IWB systems participating in the session. The information written at an IWB system may also be projected and displayed on the display surface of that IWB system. In this manner, the information written on the surface of one IWB system is also displayed on surfaces of the other remote IWB systems involved in the session. This enables remotely located IWB systems to be used collaboratively wherein remotely located users can interact as if writing on the same whiteboard.

For example, in FIG. 2, a user 208 local to IWB system 200 may use a writing instrument to write on surface 202 of IWB system 200. The writing is captured by a writing capture system of IWB system 200 and controller 204 of IWB system 200 determines digital information corresponding to the written information. The digital information determined by controller 204 may then be displayed on surface 202 of IWB system 200. Controller 204 may also communicate the digital information to the IWB system 250 where it is projected and displayed on display surface 252. In this manner, information written by user 208 on surface 202 is displayed and can be viewed by both users of IWB system 200 and IWB system 250. For example, in FIG. 2, the letter "W" 220 written by user 208 at IWB system 200 is projected on surface 202 and also on surface 252 (as "W" 270), thereby enabling users of both IWB systems to view the information. In a similar manner, for any information written on surface 252 of IWB system 250, controller 254 is configured to determine digital information corresponding to the written information and cause the determined digital information to be projected and displayed on surface 252 of IWB system 250 and also on surface 202 of IWB system 200. For example, in FIG. 2, the letter "N" 260 written by user 256 at IWB system 250 is projected on surface 252 and also on surface 202 (as "N" 206), thereby enabling users of both IWB systems to view the information. The manner in which the information is projected at both the IWB systems gives the feel that users of IWB system 200 and IWB system 250 are writing on the same display surface or whiteboard in a collaborative environment.

Accordingly, for IWB systems participating in a collaborative session, the information projected by each IWB system may comprise digital information corresponding to writings captured locally at that IWB system and also digital information received from other remote IWB systems participating in the collaborative session, where the digital information received from a remote IWB system comprises digital information corresponding to information written locally at that remote IWB system. For example, in FIG. 2, the information projected at IWB system 200 includes digital information corresponding to letter "W" written locally at IWB system 200 and also digital information received from IWB system 250 corresponding to letter "N" 260 written locally at IWB system 250. In one embodiment, both pieces of digital information (i.e., the digital information corresponding to local writings and the digital information received from a remote IWB system corresponding to writings made locally at that remote IWB system) may be cached locally by controller 204 of IWB system 200. For example, the information may be stored as content 212 in a storage 210 local to IWB system 200. In a similar manner, controller 254 of IWB system 250 may store digital information corresponding to local writings at IWB system 250 and the digital information received from IWB system 200 corresponding to writings made locally at IWB system 200 as content 264 in a local storage 262 of IWB system 250.

As previously described, each IWB system may also comprise devices for recording other types of information such as audio/video/image information. For IWB systems participating in a collaborative session, an IWB system may receive information captured locally at that IWB system and also information captured locally at other IWB systems participating in the collaborative session. For example, controller 204 may receive information captured by devices local to IWB system 200 and also receive, from IWB system 250, information captured by devices local to IWB system 250. In one embodiment, controller 204 may also store this information as part of content 212 in local storage 210. In a similar manner, controller 254 may receive information captured by devices local to IWB system 250 and also receive, from IWB system 200, information captured by devices local to IWB system 200. In one embodiment, controller 254 may also store this information as part of content 264 in local storage 262.

There are various ways in which an IWB system may receive information captured at one or more remote IWB systems. In one embodiment, IWB system 200 may be connected to IWB system 250 over a LAN or WAN using a shared messaging service that complies with the Java Message Server (JMS) specification. Each stroke captured from either the remote or local IWB system can be published to the same channel or "topic" at the JMS and all connected devices subscribed to that topic receive the messages. In this manner, any stroke published to the channel is received by all IWB systems. One skilled in the art will recognize that there are many systems for sharing information over a LAN or WAN and many means for doing so.

As described above, according to an embodiment of the present invention, responsive to a successful login at an IWB system, an action is automatically performed using information created and stored prior to the login. For an IWB system participating in a collaborative session, the information created and stored prior to the login may include information determined or captured locally at the IWB system (e.g., digital information determined at that IWB system, information captured by devices local to the IWB system) and also information received from other IWB systems participating in the collaborative session (e.g., digital information and captured information received from remote IWB systems participating in the collaborative session) prior to the login. For example, when a user successfully logs into IWB system 200, responsive to the login, controller 204 may determine and initiate an action that uses content 212 (or a portion thereof) stored locally by controller 204 prior to the login. In one embodiment, the action may comprise saving the prior stored content 212 to an account corresponding to the login, where the account may be stored on a server 116 coupled to IWB system 200 via communication network 110.

Although only two IWB systems are shown in FIG. 2, this is not intended to limit the scope of embodiments of the present invention. Any number of IWB systems may be involved in a collaborative session. It is also possible for an IWB system to be simultaneously involved in multiple separate collaborative sessions. For example, in FIG. 2, IWB system 200 is involved in a collaborative session with IWB system 250. Simultaneous with this session, IWB system 200 may also be involved in a separate collaborative session with a third IWB system (not shown), where IWB system 250 is not a participant in that separate session.

Figure 3:
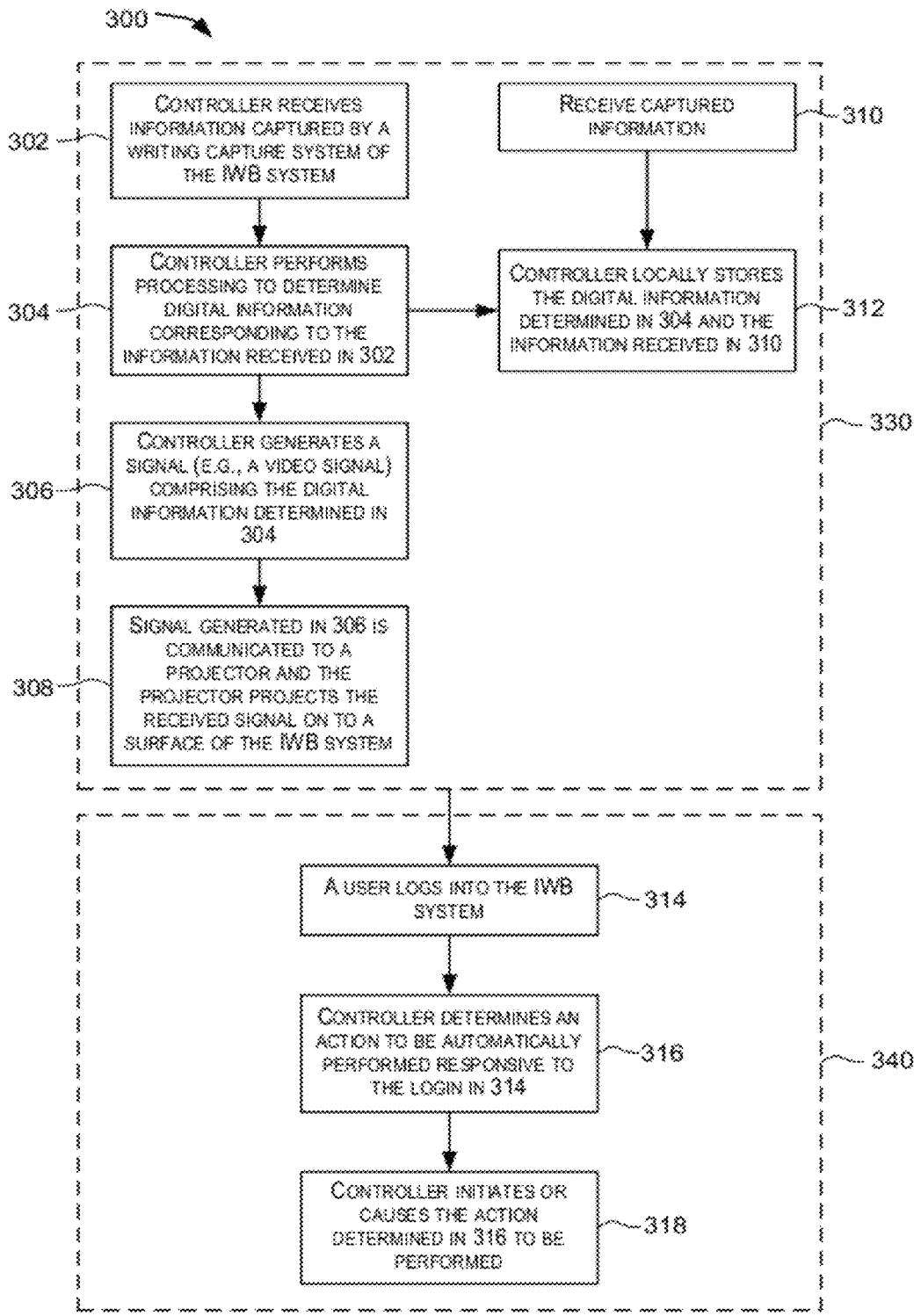
FIG. 3 depicts a simplified flowchart depicting processing performed by an IWB system according to an embodiment of the present invention.

FIG. 3 depicts a simplified flowchart 300 depicting processing performed by an IWB system according to an embodiment of the present invention. The processing depicted in FIG. 3 may be performed by one or more components of the IWB system such as a controller of the IWB system. The processing may be performed using software (e.g., code, instructions, program) executed by a processor of the controller, hardware of the controller, or combinations thereof. In one embodiment, the software executed by a controller may be stored on a non-transitory computer-readable storage medium.

The processing depicted in FIG. 3 is divided into a set of steps 330 corresponding to processing performed independent of a login and a set of steps 340 corresponding to processing performed responsive to a login. For sake of simplicity, it is assumed for the processing depicted in FIG. 3 that the IWB system performing the processing is not involved in any collaborative session. The steps depicted in FIG. 3 or the particular series of processing steps depicted in FIG. 3 are not intended to limit the scope of embodiments of the present invention. Other or different processing steps may be performed in alternative embodiments. One or more of steps depicted in FIG. 3 may be performed in parallel or may be performed in a serial manner.

As depicted in FIG. 3, a controller of the IWB system may receive information captured by a writing capture system of the IWB system (step 302). The controller may then perform processing to determine digital information corresponding to the information received in 302 (step 304). In one embodiment, the processing in 304 may comprise determining strokes information for the information received from the writing capture system and then determining digital information for the strokes information. In an alternative embodiment, the controller may determine digital information directly from the information received in 302. In one embodiment, the digital information determined in 304 reflects the writings made on the surface of the IWB system. For example, if the user writes a "W" on the surface of the IWB system then the digital representation of "W" is determined in 304.

The controller may then generate a signal (e.g., a video signal) comprising the digital information determined in 304 (step 306). Various different formats may be used to generate the video signal. The format may be such that it can be output by a projector of the IWB system. The signal generated in 306 may be communicated to a projector of the IWB system and the projector may project the signal on to the display surface of the IWB system (step 308) such that the digital information is viewable by users of the IWB system. In this manner, the information written by a user at the IWB system is converted to digital information and output on the surface of the IWB system.

The controller may also optionally receive information (e.g., video, audio, image, etc.) captured by one or more devices of the IWB system (step 310). The controller may locally store the digital information determined in 304 and the information received in 310 (step 312). The information may be stored as standard files on a local file system anonymously (i.e., not associated with any particular user account). In one embodiment, the information is stored in a temporary storage location and not associated with any user. If no user logs in, after some event (perhaps a timeout or an action like choosing "clear" from a menu) the locally stored information may be erased so that it is no longer available. Of course if someone logs in (as described below with respect to step 314), an action may be initiated using the information. The controller of the IWB system may perform steps 330 continually while the IWB system is being used irrespective of whether one or more users have logged into the IWB system. The frequency of when these steps are performed may be time-based (e.g., periodic) and/or based upon the level of activity or a combination thereof.

At some point in time, a user may log into the IWB system (step 314). The controller then determines an action to be automatically performed responsive to the login in 314 (step 316). In one embodiment, the action to be performed responsive to a login may be preconfigured for the IWB system. For example, in one embodiment, for each login, the action may be to determine an account corresponding to the login based upon information received as part of the login process and store the information stored in 312 and created prior to the login, or a portion thereof, to a storage associated with the determined account.

In an alternative embodiment, as part of the processing performed in 316, the controller may use information associated with the login in 314 to determine an action to be performed. In one such embodiment, the controller may access information stored for multiple users, where the stored information comprises for each user, information indicative of a set of one or more actions to be performed responsive to that user logging into the IWB system. In one embodiment, the multiple users information may be stored locally by the controller. In another embodiment, the multiple users information used for determining what action to perform responsive to a user login may be stored on a server (e.g., server 116 in FIG. 1) and accessed by the controller via a communication network (such as communication network 110).

Figure 4:
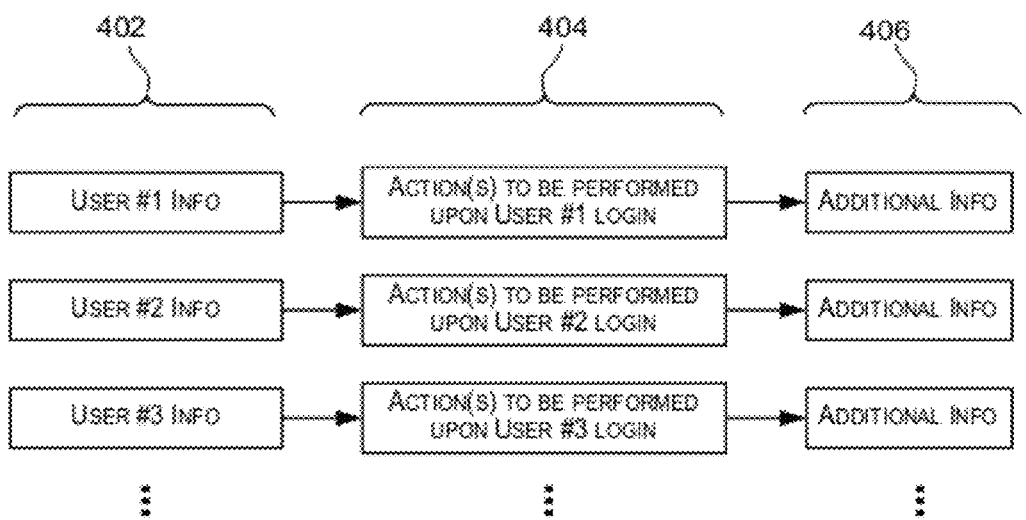
FIG. 4 depicts information that can be used to identify one or more actions to be performed for users responsive to user logins according to an embodiment of the present invention.

FIG. 4 shows an example of information that may be used by a controller to determine what action to be performed responsive to a login. As shown, the information may include information 402 identifying multiple users and information 404 identifying for each user a set of one or more actions to be performed when that user logs into the IWB system. The action(s) performed for one user may be the same as or different from the action(s) performed for another user. In one embodiment, additional information 406 may be associated with information identifying the action(s) to be performed. Additional information 406 may comprise information that is used to perform the actions. For example, additional information 406 associated with a user may identify an email address, preferred file formats, etc. to be used for performing the action. As part of the processing performed in 316, the controller of the IWB system may use login-related information received in 314 to determine a user that has logged into the IWB system and then use the actions information associated with the user to determine a set of one or more actions to be performed responsive to the user login. The additional information associated with the user or action may be used in performance of the action.

The controller may then initiate or cause the action determined in 316 to be performed using information stored in 312 (step 318). In this manner, the action is performed automatically in response to the login. Upon a login, the action is performed without requiring any input or interaction from the user who has logged into the IWB system. Further, the action is performed using information that has been created and stored prior to the user logging into the IWB system.

Figure 5:
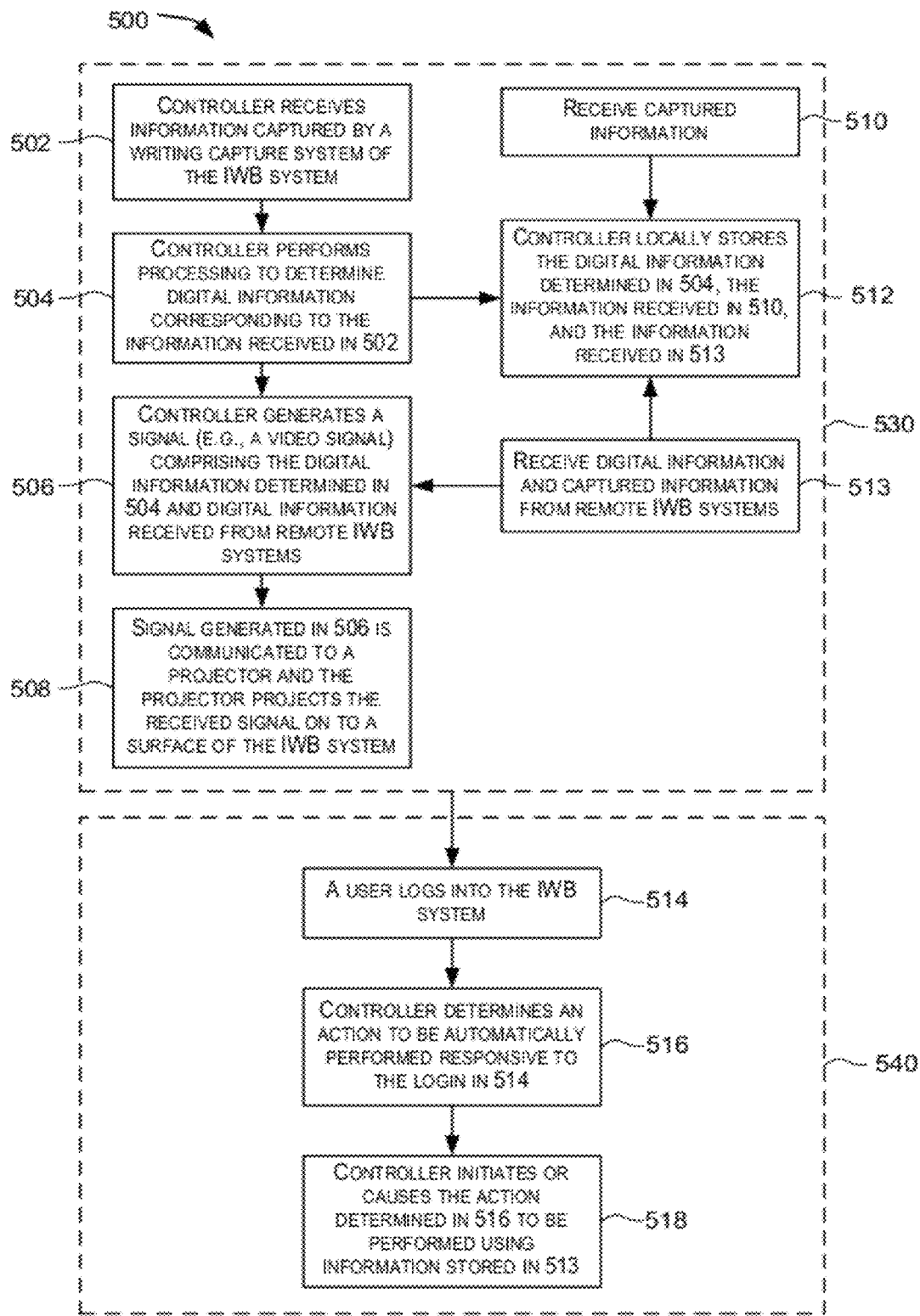
FIG. 5 depicts a simplified flowchart depicting processing performed by an IWB system participating in a collaborative session with other IWB systems according to an embodiment of the present invention.

FIG. 5 depicts a simplified flowchart 500 depicting processing performed by an IWB system participating in a collaborative session with other IWB systems according to an embodiment of the present invention. The processing depicted in FIG. 5 may be performed by one or more components of the IWB system such as by a controller of the IWB system. The processing may be performed using software (e.g., code, instructions, program) executed by a processor of the controller, hardware of the controller, operating system combinations thereof. In one embodiment, the software executed by a controller may be stored on a non-transitory computer-readable storage medium.

The processing depicted in FIG. 5 is divided into a set of steps 530 corresponding to processing performed independent of a login and a set of steps 540 corresponding to processing performed responsive to a login. The IWB system performing the processing in FIG. 5 may participate in a collaborative session with one or more remotely located IWB systems. The steps depicted in FIG. 5 or the particular series of processing steps depicted in FIG. 5 are not intended to limit the scope of embodiments of the present invention. Other or different processing steps may be performed in alternative embodiments. One or more of steps depicted in FIG. 5 may be performed in parallel or may be performed in a serial manner.

As depicted in FIG. 5, a controller of the IWB system (the local IWB system) may receive information captured by a writing capture system of the IWB system (step 502). The controller may then perform processing to determine digital information corresponding to the information received in 502 (step 504). In one embodiment, the processing in 504 may comprise determining strokes information for the information received from the writing capture system and then determining digital information for the strokes information. In an alternative embodiment, the controller may determine digital information directly from the information received in 502. In one embodiment, the digital information determined in 504 reflects the writings made on the surface of the IWB system. For example, if the user writes a "W" on the surface of the IWB system then the digital representation of "W" is determined in 504.

The local IWB system may also receive digital information from the remote IWB systems participating in the collaborative session (step 513). The digital information received from a remote IWB system may correspond to input provided by a user using a writing instrument locally at that IWB system. For example, in the embodiment depicted in FIG. 2, IWB system 200 may receive digital information corresponding to the letter "N" written by user 256 at remotely located IWB system 250.

The controller of the local IWB system may then generate a signal (e.g., a video signal) comprising the digital information determined in 504 and the digital information received from the remote IWB systems in 513 (step 506). Various different formats may be used to generate the signal. The format may be such that can be output by a projector of the local IWB system. The signal generated in 506 may be communicated to a projector of the IWB system and the projector may project the signal on to the display surface of the local IWB system (step 508) such that the digital information is viewable by users of the local IWB system. In this manner, the information written by a user at the local IWB system and information written at the remote IWB systems is output on the surface of the local IWB system.

The controller of the local IWB system may also optionally receive information (e.g., video, audio, image, etc.) captured by one or more devices of the local IWB system (step 510). The controller may optionally receive, as part of 513, information captured by devices at the remote IWB systems.

The controller may locally store the digital information determined in 504, the information received in 510, and/or the information received from the remote IWB systems in 513 (step 512). The controller of the IWB system may perform steps 530 continually while the IWB system is being used irrespective of whether one or more users have logged into the IWB system. The frequency of when these steps are performed may be time-based (e.g., periodic) and/or based upon the level of activity or a combination thereof.

At some point in time, a user may log into the local IWB system (step 514). The local controller then determines an action to be automatically performed responsive to the login in 514 (step 516). In one embodiment, the action to be performed responsive to a login may be preconfigured for the IWB system. For example, in one embodiment, for each login, the action may be to determine an account corresponding to the login based upon information received as part of the login process in 514 and store the information stored in 512 and created prior to the login (or a portion thereof) to the determined account.

In an alternative embodiment, as part of the processing performed in 516, the controller may use information associated with the login in 514 to determine an action to be performed. In one such embodiment, the controller may store information for multiple users, and for each user, a set of one or more actions to be performed responsive to that user logging into the IWB system. For example, in one embodiment, the information depicted in FIG. 4 may be used to determine the one or more actions to be performed for the login in 514. The action(s) performed for one user may be the same as or different from the action(s) performed for another user. As part of the processing performed in 516, the controller of the local IWB system may use login-related information received in 514 to determine a user that has logged into the IWB system and then use the information shown in FIG. 4 to determine a set of one or more actions to be performed responsive to the user login.

The controller may then initiate or cause the action determined in 516 to be performed using information stored in 512 (step 518). In this manner, the action is performed automatically responsive to the login. Upon a login, the action is performed without requiring any input or interaction from the user who has logged into. Further, the action is performed using information that has been created and stored prior to the user logging into the IWB system.

IWB systems are usually fixed in the room and available to anyone. In order to make them as easy to use as possible for the greatest number of people, these systems can be used without requiring a login. Enabling creation of content without a login (i.e., anonymously) and then performing one or more actions in response to a login enhances the usability of a system such as an IWB system. For example, any user can walk up to the display surface of an IWB system, and without logging in, begin to create a diagram or drawing or write text on the whiteboard of the IWB system. This feature of being able to use the IWB system without requiring a login makes the IWB system much more usable by a larger number of people—especially those unfamiliar with electronic whiteboards. A user who starts creating content of value on such a system might later decide that the diagram or drawing should be saved to the user's account. An embodiment of the present invention enables this to be automatically performed responsive to the user login. Accordingly, if the user wants to save the newly created document, he/she can log into the IWB system and the locally cached information prior to the login may be automatically uploaded and saved to a server and associated with the user's account. In one embodiment, the process of logging into the IWB system automatically creates a new document on the server under the user's account comprising the drawings content created by the user using the IWB system prior to the login.

Various different use cases may apply to embodiments of the present invention. For example, according to one use case, a novice user N may decide to use the IWB system because it is easy to use. An experienced user E with an existing IWB system account may also be in the room working with user N. User N may create some content of long term value and decide that he/she wants to save that content. User N may pull out his cell phone to capture photos of the content, then open up an email application, create an email and attach the captured photos to the email, and then send the email to himself/herself. The experienced user E, with an existing IWB system account, may however simply log into the IWB system, and this automatically causes an action to be performed that makes the created content be stored under and made accessible in user E's account. User E may then access his/her account via a laptop (e.g., using a web browser) and access the stored content.

FIG. 6 is a simplified block diagram of a computer system 600 that may be used to practice an embodiment of the present invention. In one embodiment, computer system 600 may be used to implement controller 106 illustrated in FIG. 1 and described above. As shown in FIG. 6, computer system 600 includes a processor 602 that communicates with a number of peripheral subsystems via a bus subsystem 604. These peripheral subsystems may include a storage subsystem 606, comprising a memory subsystem 608 and a file storage subsystem 610, user interface input devices 612, user interface output devices 614, and a network interface subsystem 616.

Bus subsystem 604 provides a mechanism for enabling the various components and subsystems of computer system 600 to communicate with each other as intended. Although bus subsystem 604 is shown schematically as a single bus, alternative embodiments of the bus subsystem may utilize multiple busses.

Network interface subsystem 616 provides an interface to other computer systems, networks, and storage. Network interface subsystem 616 serves as an interface for receiving data from and transmitting data to other systems from computer system 600. For example, network interface subsystem 616 of an IWB system may enable a controller to communicate with other remotely located IWB systems via a communication network such as the Internet.

User interface input devices 612 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 600.

User interface output devices 614 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 provides a computer-readable storage medium for storing the basic programming and data constructs that provide the functionality of the present invention. Software (programs, code modules, instructions) that when executed by a processor provide the functionality of the present invention may be stored in storage subsystem 606. These software modules or instructions may be executed by processor(s) 602. Storage subsystem 606 may also provide a repository for storing data used in accordance with the present invention. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 600 can be of various types including a personal computer, a phone, a portable computer, a workstation, a network computer, or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

Although specific embodiments of the invention have been described, various modifications, alterations, alternative constructions, and equivalents are also encompassed within the scope of the invention. The teachings described above may be applied to any system comprising a processor that can be booted or rebooted. For example, while embodiments have been described above using IWB systems as examples, this is not intended to be restrictive. The teachings described above and recited in the claims may also be practiced by other computing systems that enable logins and allow content to be created prior to the login. Responsive to a login, one or more actions may automatically be initiated that use the content created prior to the login.

Embodiments of the present invention are not restricted to operation within certain specific data processing environments, but are free to operate within a plurality of data processing environments. Additionally, although embodiments of the present invention have been described using a particular series of transactions and steps, these are not intended to limit the scope of inventive embodiments.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention.

What is claimed is:

1. A system comprising:
a display surface configured to accept written information comprising one or more hand-written pictorial or textual elements;
a memory; and
a processor that enables users to login into the system;
wherein the processor is configured to:
analyze the written information and generate corresponding digital information prior to a login into the system; and
responsive to a login into the system by a user, cause an action to be performed using the digital information generated prior to the login,
wherein the action is performed upon the login without any user intervention and based on information associated with the login;
wherein the information associated with the login exists prior to the login by the user; and
wherein the written information is not associated with the user prior to the login by the user.

2. The system of claim 1 wherein the action comprises saving the digital information created prior to the login to an account corresponding to the login.

3. The system of claim 1 wherein the processor is configured to:
receive content created, prior to the login, using a second system located remotely from the system; and
cause the action to be performed using the content received from the second system.

4. The system claim 1 further comprising:
a projector configured to project the digital information on the display surface.

5. The system of claim 1 further comprising:
one or more devices configured to capture audio or video information prior to the login;
wherein the processor is configured to perform the action using the audio or video information captured by the one or more devices.

6. The system of claim 1 further comprising:
a reader configured to read a barcode or radio frequency identification (RFID) tag to enable the login.

7. A method comprising:
receiving, by a first system, written information provided on a display surface, the written information comprising one or more hand-drawn pictorial or textual elements;
generating, by the first system, digital information corresponding to the written information prior to a login at the first system; and
responsive to a login by a user at the first system, determining, by the first system, an action to be performed based on information associated with the login and wherein the information associated with the login exists prior to the login by the user, and the written information is not associated with the user prior to the login by the user;
performing, by the first system, the action without any user intervention, using the digital information created prior to the login.

8. The method of claim 7 wherein the action comprises saving the digital information created prior to the login to an account corresponding to the login.

9. The method of claim 7 further comprising:
receiving, from a second system located remotely from the first system, content created, prior to the login, using the second system; and wherein performing the action comprises performing the action using the content received from the second system.

10. The method of claim 7 further comprising:
outputting the digital information on the display surface of the first system.

11. The method of claim 7 further comprising:
capturing audio or video information prior to the login using one or more devices of the first system; and
performing the action using the captured audio or video information.

12. The method of claim 7 further comprising:
enabling the login by reading a barcode or radio frequency identification (RFID) tag.

13. A non-transitory computer-readable storage medium storing a plurality of instructions for execution by a system, the plurality of instructions comprising:
instructions that cause the system to accept written information provided on a display surface, the written information comprising one or more hand-drawn pictorial or textual elements;
instructions that cause the system to generate digital information corresponding to the written information prior to a login by a user into the system;
upon login to the system by the user, instructions that cause the system to determine an action to be performed using the digital information, the action being based on information associated with the login, wherein the information associated with the login exists prior to the login by the user, and the written information is not associated with the user prior to the login by the user; and
instructions that cause the system to, responsive to the login at the system by the user, perform the action using the digital information created prior to the login and without any user intervention.

14. The non-transitory computer-readable storage medium of claim 13 wherein the instructions that cause the system to perform the action comprise instructions that cause the system to save the digital information created prior to the login to an account corresponding to the login.

15. The non-transitory computer-readable storage medium of claim 13:
wherein the plurality of instructions further comprises instructions that cause the system to, receive, from a second system located remotely from the system, content created prior to the login using the second system; and
wherein the instructions that cause the system to cause the action to be performed comprise instructions that cause the system to perform the action using the content received from the second system.

16. The non-transitory computer-readable storage medium of claim 13 wherein the plurality of instructions further comprises:
instructions that cause the system to project the digital information on to the display surface.

17. The non-transitory computer-readable storage medium of claim 13 wherein the plurality of instructions further comprises:
instructions that cause the system to capture audio or video information prior to the login;
wherein the instructions that cause the system to perform the action comprise instructions that cause the system to perform the action using the captured audio or video information.

18. The non-transitory computer-readable storage medium of claim 13 wherein the plurality of instructions further comprises:
instructions that cause the system to enable the login by reading a barcode or radio frequency identification (RFID) tag.

19. The system of claim 1 wherein the action comprises communicating the digital information to one or more users upon login without any user intervention.

20. The system of claim 1 wherein the processor is further configured to:
upon login by a first user, cause a first action to be performed using the digital information, the first action being performed without user intervention and based on preconfigured information associated with the first user login; and
upon login by a second user, cause a second action to be performed using the digital information, the second action being performed without user intervention and based on preconfigured information associated with the second user login.

21. The method of claim 7 further comprising:
upon login into the first system by a first user, performing a first action using the digital information, the first action being (i) based on information associated with the login of the first user and (ii) performed without any user intervention; and
upon login into the first system by a second user, performing a second action using the digital information, the second action being (i) based on information associated with the login of the second user and (ii) performed without any user intervention.

22. The method of claim 21 wherein the first action is different from the second action.

23. The non-transitory computer-readable storage medium of claim 13 wherein the plurality of instructions further comprises:
instructions that cause the system to perform a first action using the digital information upon login into the system by a first user, the first action being based on preexisting information associated with the login of the first user; and
instructions that cause the system to perform a second action using the digital information upon login into the system by a second user, the second action being based on preexisting information associated with the login of the second user;
wherein the first and the second actions are performed without user intervention.

24. The non-transitory computer-readable storage medium of claim 23 wherein the first action comprises one of: communicating the digital information to one or more users or formatting a portion of the digital information.

* * * * *